Patented Jan. 7, 1947

2,413,814

UNITED STATES PATENT OFFICE 2,413,814

COMPOSITION CONTAINING AN ESTERIFIED ACIDIC SULFO-POLYCARBOXY ACID FRACTIONAL ESTER OF AN OXYETHYLATED ALCOHOLIFORM POLYHYDROXY BODY

Melvin De Groote, University City, and Bernhard Keiser, Webster Groves, Mo., assignors to Petrolite Corporation, Ltd., St. Louis, Mo., a corporation of Delaware No Drawing. Application May 6, 1943, Serial No. 485,900

9 Claims. (Cl. 260—481)

This invention relates to new compositions useful for a variety of purposes including use as wetting agents, emulsifying agents, demulsifying agents, surface active agents, peptizing agents, textile assistants, and for other purposes.

The new compositions are esterified materials resulting from the esterification of (1) a fractional ester of a sulfo-polycarboxy acid with an oxyalkylene derivative of a polyhydroxy material having at least 3 hydroxyl groups with (2) a compound or compounds having at least one free hydroxyl group, usually an alcoholiform hydroxyl group.

Typical, and perhaps most important, of the compositions of the invention are derivatives of glycerin, in which the 3 hydroxyl groups of the glycerin are replaced by polyoxyalkylene chains and in which one or more of the hydroxyl groups at the end of these chains is esterified with one of the carboxyls of an aliphatic sulfo-discarboxy acid, such as sulfo-succinic acid, leaving one or more free carboxyl groups, depending upon the molar ratio of the acid used and the oxyalkylated glycerin, and in which at least one such carboxy group is esterified by a hydroxylated material, usually an alcohol, while other carboxy groups, if any, may remain free or may be neutralized by a basic material, or esterified with another alcohol, converted to an amido group or otherwise blocked. Such compositions may be represented by the type formula:

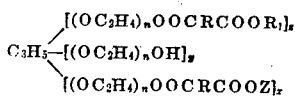

in which R is the residue of a sulfo-dicarboxy acid such as sulfo-succinic acid, in which the sulfo group may be neutralized, R₁ is the residue of a hydroxy body, Z is an acid hydrogen or its equivalent, $x$ may be 0 to 2, $y$ may be 0 to 2 and $z$ may be 1 to 3, the sum of $x$, $y$ and $z$, of course, being 3.

Corresponding products may be prepared from such polyhydroxy materials as the sugar alcohols, e. g., sorbitol, mannitol, dulcitol, pentaerythritol, glycerin polymers such as diglycerol, triglycerol or mixed polyglycerols, dipentaerythritol monoether, erythritol, arabitol, zylitol, rhamnitol, sorbitan, mannitan, triethanolamine and other trihydroxy bodies such as the acetamide of tris(hydroxymethyl)aminomethane, tetrahydroxylated ethylenediamine, cyclic diglycerol, and the like, the essential requirement being that the material have at least 3 alcoholiform hydroxyl groups so that oxyalkylated derivatives of the type illustrated in the foregoing formula may be prepared thereby.

The new compositions may be prepared in various ways. They may be prepared, for example, by preparing the corresponding unsulfonated product using an unsaturated polybasic acid such as maleic acid or its anhydride and treating the resulting unsaturated ester with a material such as sodium bisulfite, sodium sulfite or other bisulfite or sulfite to convert the unsaturated compound to the sulfoderivative of the corresponding saturated acid, e. g., from a maleic acid derivative to a derivative of sulfo-succinic acid. If this method of preparation is used, the unsulfonated products may also be prepared in various ways.

Perhaps the simplest way to prepare them is to prepare the oxyalkylated polyhydroxy body, which itself is a polyhydric alcohol, by treatment of the polyhydroxy body with an alkylene oxide, usually ethylene oxide, then react the oxyalkylated product with the acid to give an acidic intermediate product which, in turn, is reacted with a hydroxylated body, usually an alcoholic body, to form the final product. Instead of reacting the acid first with the oxyalkylated polyhydroxy material, it may first be reacted with the other hydroxy body or bodies forming a fractional ester having at least one free carboxyl group, and this in turn may be reacted with the oxyalkylated polyhydroxy body.

These two procedures are illustrated by the following type equations, using glycerol, ethylene oxide, maleic anhydride, and dodecyl alcohol as illustrative of the respective classes of materials from which the new compositions may be prepared:

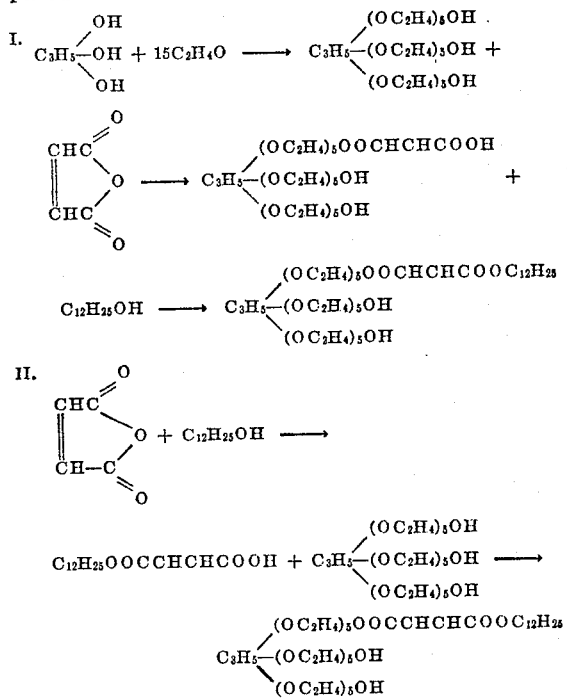

The new compositions may also be prepared using the sulfo-polycarboxy acids as starting materials, by reacting them in the form of their alkali metal salts with an oxyalkylated polyhydroxy body, e. g., oxyethylated glycerol, to form a fractional ester having at least one free carboxy group and at least one carboxy group esterified with the oxyalkylated polyhydroxy body, while the sulfo group is neutralized by an alkali metal, and subsequently esterifying the resulting fractional ester with whatever hydroxylated body is desired.

The reactions by which these new compositions are prepared are known, and the invention of the present application lies, not in the reactions involved, but in the new compositions of matter formed.

The reactions involved in producing the new compositions are largely esterification reactions, which are readily carried out in known ways. In general, they involve reaction of a carboxy acid (or anhydride) with a hydroxylated body or bodies, and this reaction is readily carried out by heating to a temperature sufficiently high for the reaction to proceed with reasonable speed, usually to around 100 to 200° C., but below the temperature of decomposition, which may vary with different materials. These reactions may be hastened by the addition of small quantities of a suitable catalyst, such as benzene sulfonic acid, or the like, or by bubbling a dry, inert gas through the reaction mixture, or in other ways, as by carrying the reaction out in boiling xylene or other water-immiscible solvent, with condensation of the vapors, separation of the xylene and water, and return of the xylene to the reaction zone in accordance with known practice. In some instances, the reaction may proceed to produce polymeric forms of products, as distinguished from the monomeric form illustrated above. While the polymeric products are not polymers in the strict sense of involving simply the addition of one molecule to another, but are produced through continued condensation with elimination of water, they are polymerized or polymeric materials, as those terms are commonly used. This is true both with respect to those procedures in which a sulfo-polycarboxy acid is used as a starting material and those procedures in which the sulfo group is introduced by the use of the reaction between an unsaturated acid residue and a bisulfite or sulfite.

The oxyalkylation reactions are readily carried out in the known way, for example, by introducing the polyhydroxy body into an autoclave and gradually adding the alkylene oxide, e. g., ethylene oxide, while maintaining the temperature at about 100–150° C. An alkaline catalyst may be used if desired, but is usually unnecessary. The other reactions, which are esterification reactions, are also readily carried out in known ways, for example, by heating the carboxy body with the hydroxylated body to a sufficiently high temperature for the reaction to proceed with reasonable speed, usually in the range of 100–200° C. but below the temperature of undue pyrolytic decomposition. These esterification reactions may be hastened by the use of small quantities of suitable catalysts such as benzene sulfonic acid or the like, by bubbling a dry inert gas through the reaction mixture, by carrying out the reaction in boiling xylene or other water-immiscible solvent, removing the water vapors and returning the xylene to the reaction zone in the usual way. This last procedure hastens the reaction by providing effective removal of the water which is formed but cannot be used, of course, with such low boiling materials as ethanol. Absorption of the water as it is formed by the use of a desiccant such as Drierite (anhydrous calcium sulfate) will also speed up the reaction, but this procedure is usually more expensive than other available procedures.

For simplicity, the essential types of radicals which enter into the formation of the new compositions will be separately described in terms of compounds from which they may be readily derived; but it must be recognized that it is not always necessary to use these compounds for their production. For example, where the sulfo-polycarboxy acid residues are described in terms of acids, it will be understood that the acids themselves may never be used in the preparation of the products, and even the corresponding unsaturated acids may never be used, as in the instance where maleic anhydride is used as a raw material and the product is eventually converted to a sulfo-succinic acid derivative through the use of a bisulfite or the like.

*Polyhydroxy compounds*

The polyhydroxy compounds which serve as a nucleus for the new compositions are those which have at least 3 alcoholiform hydroxyl groups. Glycerin is the most important member of this class, and for that reason, in the examples which follow, its use will be illustrated. Other polyhydroxy compounds, such as erythritol, pentaerythritol, arabitol, rhamnitol, xylotol, pyrogallol, hydroxyquinol, phloroglucinol, sorbitol, mannitol, dulcitol, polyglycerols including di-, tri- and tetraglycerol, glycerol-glycol ethers, triethanolamine and other trihydroxyamines, e. g., ethylethanolglycerolamine, tris(hydroxymethyl) aminomethane acetamide, tetrahydroxyethylenediamine, cyclic diglycerol, and the like, may be used. Essentially, all of these materials have at least 3 alcoholiform hydroxyl groups which may be reacted with an alkylene oxide to produce the corresponding oxyalkylated derivative which forms the nucleus of the new compositions of the invention. The polyhydroxy compounds which may be used have relatively small molecules, and contain not more than 10 carbon atoms. There are available polyhydroxy compounds having at least 3 hydroxyl groups, such as castor oil, in which the molecule is large, containing in excess of say 50 carbon atoms. Such materials are not included among the polyhydroxy compounds which form the nucleus of the new compositions of the invention. In these compositions, the oxyalkylene chains must be close to the nucleus of the polyhydroxy compounds; and in oxyalkylated castor oil, that is, oxyalkylated triricinolein, they are not.

Oxyalkylene chains

The new compositions have linked to the hydroxyls of the polyhydroxy radicals described above alkylene oxide chains. Usually and advantageously, these are ethylene oxide chains, derived by reacting the polyhydroxy material with ethylene oxide in suitable proportions, but they may be other alkylene oxide chains, derivable, for example, from such materials as propylene oxide, butylene oxide, or glycid, which may be regarded as hydroxypropylene oxide. Instead of introducing the oxyalkyl chain onto the polyhydroxy compound through the use of an alkylene oxide, they may be introduced through the use of an oxyalkylene glycol, such as tetraoxyethylene glycol, by an esterification reaction; but ordinarily the use of the alkylene oxide is simpler and is to be preferred.

The length of the oxyalkylene chain attached to each of the hydroxyl groups of the polyhydroxy body may vary. With glycerin, advantageously from 3 to 10 oxyethylene groups will be linked to each hydroxyl group, that is, from 9 to 30 moles of ethylene oxide will be used for each mole of glycerin. Of course, this must be taken on a statistical basis, because there is no way of knowing whether the same number of oxyalkylene groups become linked to each of the hydroxyl groups of the glycerin or not. In other words, if 9 moles of ethylene oxide are used for each mole of glycerin, 3 oxyethylene groups may become linked to each hydroxyl of the glycerin, or 4 may become linked to one hydroxyl, 2 to another and 3 to the third, etc.

With higher alkylene oxides, such as propylene oxide, or butylene oxide, it is usually desirable to use a little larger proportion of the alkylene oxide, for example, from 12 to 36 moles for each mole of glycerin.

With polyhydroxy compounds having about the same ratio of hydroxyl group weight to total weight as glycerin, for example sorbitol, the proportions of alkylene oxide used may be about the same as those with glycerin, calculated on the basis of each hydroxyl group. On the other hand, with materials such as pyrogallol, the proportion of alkylene oxide will usually be increased somewhat, e. g., so that 24 to 36 ethylene oxide groups may be used for each mole of pyrogallol.

As previously pointed out, the oxyalkylation of a polyhydroxy substance such as glycerin with an alkylene oxide such as ethylene oxide is readily carried out in the known way, by placing the glycerin in an autoclave and admitting the ethylene oxide, either gradually or in small batches while maintaining a temperature of 100–180° C., usually 150–180° C., with the use of a little alkali, such as caustic soda, as a catalyst, if desired.

The sulfo-polycarboxy acids

The new compositions may contain the residues of various sulfo-polycarboxy acids, including those of saturated and unsaturated aliphatic dicarboxy acids. Of particular importance is sulfo-succinic acid, the derivatives of which are best prepared by first preparing the corresponding derivative of maleic acid or maleic anhydride, and converting it to the sulfo-succinic compound or compounds by treatment with sodium bisulfite or the like. This reaction has been discussed at length in the Jaeger Patent 2,028,091, and reference is made to that patent for a detailed discussion of the reaction involved. That patent also lists a number of sulfo-polycarboxy acids, including mono and disulfo-succinic, sulfo-chlorsuccinnic, sulfo-adipic, sulfo-pyrotartaric, sulfo-glutaric, sulfo-suberic, sulfo-sebacic, sulfo-maleic, sulfo-fumaric, sulfo-dimethylsuccinic, sulfo-methylglutaric, sulfo-alkylsuccinic, sulfo-alkylglutaric, sulfo-pimelic, and other sulfo-polycarboxy acids, and any of these acids may be used, or their residues may be formed in the final compositions by conversion of the residue of another acid thereto, as for example, where a maleic acid derivative is converted to the sulfo-succinic acid residue. Where the esters of the invention are produced by esterification of a sulfo-polycarboxy acid, e. g., sulfo-adipic acid, with an alcohol and an oxyalkylated polyhydroxy body, the sulfo-polycarboxy acid will be used in partially neutralized form, that is, with the sulfo-group blocked or neutralized, for example, by sodium or potassium.

Selection of the sulfo-acid combined in ester form in the final product will usually depend upon price and convenience of manufacture, and the particular properties desired in the final product, as these properties are, of course, influenced by the nature of the acid. For example, if the acid has a large hydrocarbon nucleus, as in certain alkylated sulfo-succinic acids or the like, this nucleus may function as a hydrophobe group and influence the polarity characteristics of the product.

The sulfo-succinic acid derivatives are particularly useful. They are readily produced by treating the corresponding maleic acid compound with sodium bisulfite or the like. The maleic acid derivatives are readily prepared from maleic anhydride. Maleic anhydride is readily available, inexpensive in price on a molar basis and readily reacts to produce the desired esters.

Hydroxylated bodies

The hydroxylated bodies which may be used in forming the new compositions, in the ways described above or in other ways, include a wide range of bodies having one or more alcoholic hydroxyl groups which can be esterified by carboxylic acids, including water-soluble compounds, water-insoluble compounds and water-dispersible compounds, i. e., self-emulsifiable compounds. Products in which the hydroxylated body is a high molal compound having at least 8 carbon atoms joined together without interruption by a hetero atom are of outstanding importance, and are particularly valuable for demulsification of crude oil emulsions. Included are hydroxylated bodies ranging from the simple lower aliphatic alcohols, e. g., ethanol and the lower water-soluble amino alcohols, e. g., triethanolamine, through the water-insoluble higher aliphatic alcohols such as lauryl, cetyl and octadecyl alcohol, the more complex hydroxy esters or acids such as castor oil an dihydroxy stearic acid ethyl ester, through the highly complex hydroxylated amines and amides such as the hydroxylated polyalkylene polyamines, acylated hydroxylated polyamines, hydroxylated acylated amino ethers, partially esterified polyhydric alcohols and polyglycerols, etc. For convenience, those hydroxylated bodies will be classified to show by appropriate illustrations various types of hydroxylated bodies contemplated and subclasses to which they belong.

1. *Aliphatic alcohols.*—Any of the aliphatic alcohols, water-soluble or water-insoluble, saturated or unsaturated, substituted or unsubstituted, may be used. Included are ethyl alcohol, butyl alcohol, isopropyl alcohol, hexyl alcohol, oleyl alcohol, dodecanol, alcohols derived by the hydrogenation of mixed higher fatty acids, particularly those naturally occurring in fats and oils, the alcohols derived by the saponification of naturally occurring waxes such as spermaceti, etc.

2. *Miscellaneous hydroxy hydrocarbon compounds.*—Included in this group of alcohols are the more or less complex mixtures of hydroxylated bodies resulting from the reduction of naphthenic acids, the "wax acids," that is, the acids resulting from the oxidation of petroleum, resinic acids, abietic acids, tall oil, and other products of this nature.

3. *Aromatic alcohols.*—The aromatic alcohols which may be used include the aralkyl alcohols such as benzyl and phenylethyl alcohol, as well as the alkyl, cycloalkyl, aralkyl or aryl ethers of polyhydric alcohols such as the cresol, phenol, naphthol, cyclohexanol and benzylic ethers of a glycol or glycerin.

4. *Phenols.*—The phenols are hydroxylated bodies which may be used in producing the new esters. Included are the simple monohydroxy phenols such as phenol, naphthol, cresol and xylenol; the polyhydroxy phenols such as resorcinol, alkyl resorcinols, catechol, hydroquinone and other alkylated derivatives, as well as such phenolic bodies as guaiacol and the like.

5. *Hydroxylated esters.*—A wide range of hydroxylated esters may be used in producing the new compounds. Such hydroxylated esters may result from the esterification of a hydroxy acid with an alcohol or from esterification of a non-hydroxy acid with a polyhydric alcohol or phenol. They may have more than one hydroxy group, e. g., as in such hydroxylated bodies as result from the partial esterification of a polyhydric alcohol or a polyhydroxy phenol with a hydroxy fatty acid. Thus, included in this group of hydroxylated bodies are the ricinoleic acid esters of various alcohols, particularly the simple aliphatic alcohols or glycols or glycerin, such as castor oil, ethyl ricinoleate, the monoricinoleic acid ester of ethylene glycol, etc., and corresponding esters of dihydroxy stearic acid and the like. With a lower hydroxy acid, such as lactic acid, the alcohol used will advantageously be a higher, water-insoluble alcohol, such as octyl alcohol, dodecyl alcohol or the like, although the esters of lactic acid with lower alcohols such as ethyl alcohol or glycol may be used, particularly for the production of compositions which are highly water-soluble. In addition to these, the mono-esters of such phenols as resorcinol and catechol are included, whether the acid be of low molecular weight such as acetic acid, or of higher molecular weight such as oleic acid. Of particular importance are the esters of the detergent forming acids, that is, those carboxylic acids having more than eight carbon atoms and usually not more than 32 carbon atoms, including the acids occurring naturally in oils and fats, particularly castor oil, the naphthenic acids, resin acids, tall oil and the like, with polyhydric alcohols, for example, the mono and diglycerides, the half esters with glycerols, the partially esterified polyglycerols, partially esterified sugar alcohols, etc.

6. *Alicyclic alcohols.*—This group includes the simple alicyclic alcohols such as cyclopentanol, cylohexanol, and their alkylated homologues such as methyl or ethyl cyclohexanol and, for convenience of classification, the wholly or partially hydrogenated phenols and alkylated phenols such as tetrahydrophenol, hexa-, octa- and decahydronaphthol, etc., as well as the alicyclic aliphatic alcohols, such as cyclohexylethanol, etc.

7. *Amides of hydroxy acids.*—This group includes the amides of the hydroxy acids generally, including the low molecular weight hydroxy acids and the high molecular weight hydroxy acids. The lower ones are usually water-soluble, while the amides of the higher acids are water-insoluble. The amides may be amides of such hydroxy fatty acids as lactic acid, glycolic acid, and hydroxy butyric acid, although they will usually be formed from the higher water-insoluble hydroxy acids, the commonest of which is ricinoleic acid, including such acids as hydroxy stearic acid, dihydroxy stearic acid, diricinoleic acid, aleuritic acid and the like. In the oxidation of petroleum hydrocarbons, hydroxylated wax acids are commonly produced as a by-product, and these may be used. Other hydroxylated acids are readily produced by known procedures, as in the conversion of undecylenic acid to hydroxy undecenoic acid. Similarly, the naphthenic acids and other acids can be converted into hydroxylated product which may be used. Unsaturated hydroxy acids such as ricinoleic acid can be converted into hydroxylated aryl stearic acid by reaction with benzene in the presence of aluminum chloride, or hydroxylated products may be produced by the desulfonation of a sulfoaromatic acid, and such bodies may be used. Another group of hydroxy acids which may be converted to amides for use are the alpha hydroxy acids derived by hydrolysis of the alpha halogen substituted acids such as alpha-bromcaproic acid, alpha-bromcaprylic acid, etc.

These amides are readily prepared in the known ways by treating the acid or a derivative thereof, such as the acyl halide or ester, with ammonia or a primary or secondary amine. The methods of producing amides in this way are well known. Usually, for reasons of cost and simplicity, and except in certain instances where it is desired to reduce water solubility, ammonia will be used. However, the primary amines, particularly the lower amines such as butyl amine, anilin and cyclohexylamine will also give highly satisfactory amides. The corresponding secondary amines can also be used.

8. *Hydroxylated amides.*—The amides described in paragraph 7 are the amides resulting from the treatment of a hydroxy acid or suitable derivative thereof, with ammonia or an amine. The hydroxylated amides of this group are those in which an acid amide is substituted by a hydroxy hydrocarbon radical containing at least one alcoholic hydroxyl group. Thus these compounds are of the type in which one hydrogen atom of ammonia is replaced by an acyl group, such as an acyl group corresponding to a detergent forming acid, or a lower fatty acid, such as acetic acid or butyric acid, or other carboxylic acid, and at least one of the other hydrogens of the ammonia is replaced by a hydroxy alkyl radical, such as the ethanol radical, the hydroxy propyl radical, etc., or even an oxyalkylene radical, such as results from the treatment of the acid amide with more than one mole of an alkylene oxide, such as ethylene or propylene oxide. The detergent-forming carboxy acids are those which have a sufficiently large carbon-linked chain or radical so that their salts have soap-like properties, the hydrocarbon radicals usually containing from 8 to 32 carbon atoms. Included are the fatty acids of the natural oils and fats such as cocoanut oil, tallow, and the like, oleic acid, ricinoleic acid, hydroxy stearic acid, naphthenic acids, tall oil acids, resin and abietic acids, wax acids, fish oil acids, such derivatives of these acids as the halogenated derivatives, aromatic fatty acids such as phenyl stearic acid, and the like. This class of acids is well recognized. These hydroxylated amides may be prepared in various ways, such as by reaction between the carboxy acid and a monoalkylolamine, such as monoethanolamine, monopropanolamine, etc., or by reaction of the acyl chloride of a carboxy acid with a monoalkylolamine; or by the treatment of the primary amide of a suitable carboxy acid with an alkylene oxide, such as ethylene oxide, propylene oxide, butylene oxide, etc. In this latter method particularly, there is no limitation to the production of the secondary amine type of product, but tertiary compounds, having one hydrogen of ammonia replaced with an acyl group, and the other two with hydroxy alkyl groups or one with a hydroxy alkyl group and the other with a hydrocarbon group such as an alkyl, aryl, aralkyl or alicyclic group may be produced. Where the hydroxylated amides are produced by the treatment of an alkylolamine with a carboxy acid, or ester or acyl chloride, and particularly in the latter case, the secondary amines, including the dialkylolamines and the alkyl alkylolamines may be so treated. The hydroxylated bodies so produced may have a number of hydroxy radicals in the group or groups substituted for the ammonia hydrogen atoms. For example, the amides produced from diglyceryl amine may have four hydroxy radicals.

9. *Hydroxylated amines.*—This group includes the hydroxylated amines of basic character, such as the alkylolamines, the alkylolalkylamines, etc. Of particular importance are the amines of this type which have at least one group having a hydrocarbon radical having at least eight carbon atoms and up to as many as 26 carbon atoms or even more. The hydroxyl groups of these compounds are those of a hydroxy hydrocarbon radical or radicals or similar radical or radicals, in which the carbon chain is interrupted at least once by an oxygen atom, such as a hydroxy oxyalkylene group. These hydroxylated amines may be prepared in various ways, for example, by the treatment of a primary or secondary alkyl amine with a hydroxy alkylating agent, such as ethylene, propylene or butylene oxide. Methods of producing amines of this type are well known and need not be described here. Among the hydroxylated amines which may be used are included the products resulting from the treatment with an alklene oxide of primary amines, such as ethylenediamine, butylamine, octylamine, dodecylamine, laurylamine, cyclohexylamine, cetylamine, stearylamine, oleylamine, ricinoleylamine, amines derived from naphthenic acids, from octadecadiene acids, amines derived from mixed fatty acids corresponding to naturally occurring fats and oils, decylamine, amines corresponding to oxidized wax acids, etc.; as well as secondary amines, including those having two lower alkyl groups, such as diethylamine, dibutylamine, etc., and those having two different alkyl groups, for example, methyloctylamine, ethyldecylamine, propyldodecylamine, etc. Any of these primary or secondary amines, upon treatment with an alkylene oxide, particularly ethylene oxide, yields a hydroxy alkylamine. It is not necessary that the hydrocarbon group linked to the amino nitrogen atom be an aliphatic group, as it can be an aliphatic, alicyclic, aryl or aralkyl group, for example, naphthyl, cyclohexyl, benzyl, etc. Where there is no aryl group directly joined to the amino nitrogen atom, the compounds are relatively basic type of compound.

However, for some purposes, the less basic compounds which are produced when there is an aryl group directly joined to the amino nitrogen, as when anilin or naphthylamine is treated with an oxyalkylene agent, may have advantages.

Ordinarily it is well to use an oxyalkylating agent, if that method of introducing the hydroxy group into the amine is used, which contains 4 carbon atoms or less, such as ethylene, propylene or butylene oxide or glycide, ethylene oxide being preferred. Usually, the proportions of amine and alkylene oxide used will be such that the hydroxyoxyalkylene group does not contain more than 5 ether linkages.

Amines derived from hydroxylated bodies, such as ricinoleic acid or hydroxystearic acid, as by converting the acid to the ester, the ester to the alcohol, the alcohol to the chloride and the chloride to the amine, do not require the presence of another hydroxy hydrocarbon radical.

10. *Hydroxylated polyacylated polyaminoamides.*—These compounds are those resulting from the treatment of a polyalkyleneamine, such as diethylenetriamine, triethylenetetramine, tetraethylene pentamine, and homologues thereof derived from propylene dichloride, butylenedichloride, amylenedichloride, betahydroxypropylenedichloride (glycerin dichlorhydrin), etc., with acylating agents and, if introduction of the acyl group or groups does not introduce an alcoholiform hydroxyl group, with an oxyalkylating agent, such as ethylene, propylene or butylene oxide. One or more acyl groups may be introduced, and one or more hydroxy radicals, such as hydroxy alkyl radicals or hydroxy alkylene radicals may be introduced. The most useful are those compounds in which there are (1) two acyl radicals derived from lower carboxy acids, that is, those having five or less carbon atoms linked to the terminal nitrogen atoms, (2) an acyl radical derived from a detergent-forming monocarboxy acid, that is, a carboxy acid having from 8 to 32 carbon atoms, (3) an alcoholiform hydroxyl radical, and (4) at least one basic amino nitrogen group, that is, an amino nitrogen radical free from directly linked acyl or aryl radicals.

These compounds are readily produced by treating the polyalkyleneamine with the carboxy acid (or amide, ester, anhydride, acyl chloride or other suitable derivative thereof) to introduce the acyl group or groups. Usually, if the terminal nitrogen atoms are to be acylated with a lower acid, such as acetic acid, formic acid, propionic acid, butyric acid, furioc acid, lactic acid, hydroxy butyric acid, or the like, it is advantageous to treat the polyalkyleneamine with whatever agent is used to introduce such acyl groups, and subsequently, to introduce the acyl group of the detergent-forming carboxy acid, before or after the introduction of the group having the alcoholiform hydroxy radical. Thus, after the introduction of the one or two or more acyl groups of a lower carboxy acid, the polyalkyleneamine may be treated to introduce the higher acyl group or it may first be treated with an alkylene oxide to introduce a hydroxylated group and then treated to introduce the higher acyl group. Thus the higher acyl group may be introduced in the acyl form linked to the amino nitrogen, or may be introduced in the ester form, linked to a hydroxy alkyl or hydroxy oxyalkyl group, as long as there remains in the compound at least one free alcoholiform hydroxyl group.

11. *Acylated amino-ethers.*—This group of compounds includes those in which an etherified amine is acylated, usually by a detergent-forming monocarboxy acid, although it may be by other types of acids, such as the lower fatty acids or other acids, the acylated product having at least one alcoholic hydroxyl radical, which may be attached to the acyl group or groups, or may be linked to an amino nitrogen through an alkyl group, or may be a portion of the etherifying radical, as in the case of an ether of an alkylolamine with a polyhydric alcohol, in which one of the hydroxyl groups is acylated with a detergent-forming acid and another is free. Thus the group includes such compounds as the acyl derivatives of the ethers of triethanolamine with polyhydric alcohols such as glycerin, polyglycerol, glycol, alkylolamines, hydroxylated amidoamines, aryl alkanolamines, etc. The acyl group is usually linked to the ether by an ester linkage, although it may be so linked by an amide linkage. Typical compounds are those resulting from the acylation of the ether of monoethanolamine with glycerin; or the etherification of diethanolamine with a monoglyceride of a higher fatty acid; the simple ether of triethanolamine with a mono or diglyceride of a higher fatty acid, at least one of the hydroxyl groups of the triethanolamine being free, etc. In the following table giving typical formulae of amino ethers which may be acylated to produce compounds included within the present group, the letter T indicates an amino hydrogen, or a substituent therefor, such as an alkyl group, an alkylol group, an aryl group, an aralkyl group, or other group which may be used to replace an amino hydrogen atom in the production of suitable compounds. The compounds illustrated may be acylated with a detergent-forming monocarboxy acid, or other carboxylic acid, (or, of course, by the corresponding acid halide, amide, ester, etc.) to provide a compound of the present group.

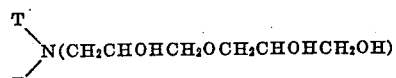

TN(CH₂CHOHCH₂OCH₂CHOHCH₂OH)₂

N(CH₂CHOHCH₂OCH₂CHOHCH₂OH)₃

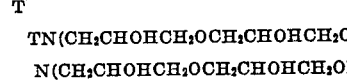

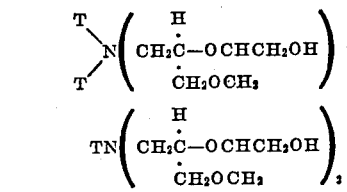

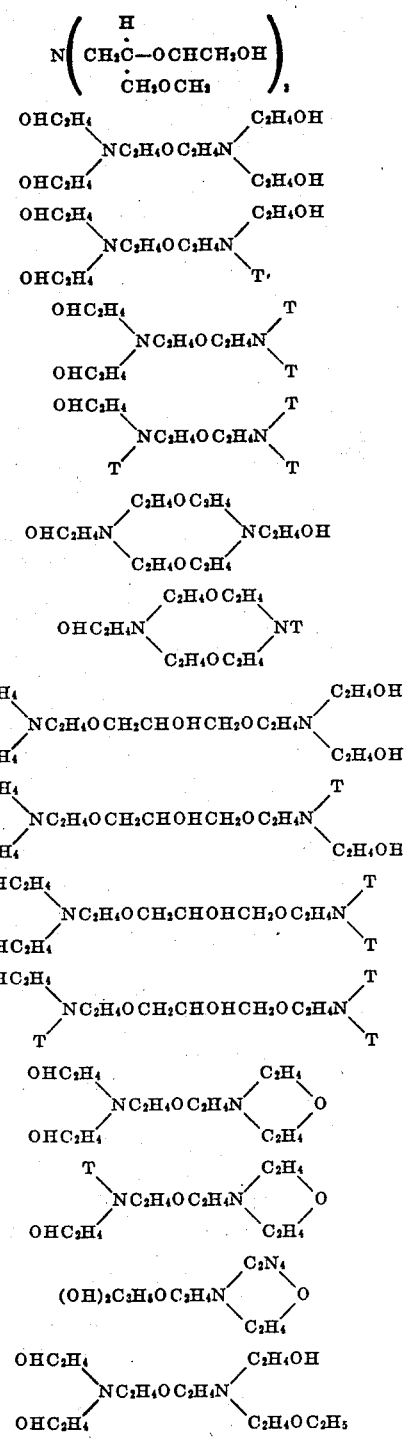

The foregoing compounds are, of course, illustrative of the type of compound contemplated in the present group. Where the radical C₂H₄ occurs, it may be replaced by other suitable radicals such as C₃H₆, C₄H₈, etc., or by residue from an alicyclic radical, such as the cyclohexyl radical, or a residue of a benzyl radical, etc. The glyceryl radical may be replaced by homologues, such as methyl glycerol, etc. Instead of the monomeric formula illustrated, the compounds may in fact be in the polymeric form, containing a large number of residues derived, for example, from polyhydric alcohols or hydroxy alkylamines, continuous etherization in effect being the same as polymerization. The manufacture of ethers of this type is known, and need not be here further illustrated.

Acylation of the hydroxy amino ethers of the type just described results in acylated compounds of the kind included in this group. As pointed out above, the acylation may be with a detergent-forming acid acyl group, such as the higher fatty acids, naphthenic acids, wax acids, tall oil, etc., or with other types of acids, such as the lower fatty acids, e. g., acetic and butyric acids, maleic acid, etc. The acyl radical may be introduced through an ester linkage, by reaction at a hydroxyl group, or may be linked directly to a ntrogen atom to form an amide. Where the amino ether has a free hydroxyl group, for example, as a portion of a polyhydric alcohol residue, the acyl group may be linked to the polyhydric alcohol residue through an ester linkage. On the other hand, where an amino ether has more than two hydroxyl groups, all or any part of these hydroxyl groups, except one, or course, may be so acylated. On the other hand, a material such as a glycerol ether of monoethanolamine may be converted into the amide by introduction of an acyl group linked directly through the amino nitrogen atom; but in such case it is usually more convenient to form the amide first and then carry out the etherification.

Suitable products may be prepared, for example, as described in Patent 2,228,989 by the heating of a partially esterified tertiary amine with a polyhydric alcohol for a sufficient period of time to cause condensation with elimination of water and the production of an ethereal reaction product. Indeed, as described in that patent, such products may be prepared, for example, by heating a fat, for example, cocoanut oil, with triethanolamine or the like for a prolonged period at temperatures ranging up to 160 to 180° C. for a considerable period of time, e. g., two days. The course of the reaction in such case seems to be that alcoholysis of re-esterification at first takes place, with formation of a mixture of the ester of triethanolamine with glycerin, etc. If, after the alcoholysis or re-esterification has taken place, more glycerin is added and the heating is continued, etherification takes place, with the production of ethereal reaction products, such as the dihydroxypropyl ether of the monofatty acid ester of triethanolamine, along with, of course, other products, including more complex ethers. These materials are suitable for preparing the acylated derivatives of this group.

12. *Amino ethers.*—The compounds included within this group are the simple amino ethers corresponding to the unacylated compounds of the preceding group, that is, the amino ethers of the preceding group without the acyl group or groups attached thereto, although this group includes a number of materials—amino ethers—incapable of acylation to produce compounds useful in the preceding group. For example, included in this group is the ethylene glycol ether of diethylethanolamine. This compound has only one hydroxyl group, and the only amino group is a tertiary group, so that the compound cannot be acylated to produce an acylated amino ether having an alcoholic hydroxyl group; except of course if the acylation is with a hydroxy acid, such as ricinoleic acid or hydroxy stearic acid. If a hydroxy acid is used, the resulting compound belongs in the preceding group.

13. *Partial esters of alkylolamines.*—Included in this group are the partial esters of alkylolamines with carboxylic acids, particularly the higher fatty acids and other detergent-forming fatty acids. Included are the esters of such amines as triethanolamine, diethanolamine, glycerylamine, diglycerylamine, ethyldipropanolamine, etc., and in general, the esters of the various alkylolamines having more than one hydroxyl group as long as the esterification is but a partial esterification, leaving at least one hydroxyl group linked by a suitable radical, such as an alkyl or oxyalkyl radical to the amino nitrogen. Methods of producing these partial esters are known. They are readily produced by the reaction of a triglyceride, for example, with an alkalolamine in proportions such that there is present insufficient fatty acid to esterify all of the hydroxyl groups of the alklolamine. Suitable partially esterified alkylolamines may also be prepared, for example, by completely esterifying a primary or secondary alkylolamine, such as mono or diethanolamine, with a suitable carboxylic acid, and then reacting the resulting ester with an alkylene oxide, such as ethylene oxide, to introduce an oxyalkyl or hydroxyoxyalkylene group which may have a number of ether linkages, for example, five or more.

14. *Hydroxylated esters of sulfonic acids.*—This group includes esters of sulfonic acids which may be represented by the formula:

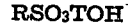

in which R represents the residue of a sulfonic acid and T represents the residue of a polyhydric alcohol. T may represent a hydrocarbon radical if the polyhydric alcohol, for example, is ethylene glycol, or may represent an oxyalkylene radical, if the polyhydric alcohol is, for example, a polyoxyalkylene glycol, or it may represent the residue of a glyceryl radical, the residue of a monoglyceride, etc. Suitable sulfonic acids include both the oil and water-soluble petroleum sulfonic acids, i. e., the green and mahogany acids, aryl sulfonic acids, including benzene sulfonic acids, cymene sulfonic acid, naphthalene sulfonic acid, alkylated naphthalene sulfonic acid, fatty sulfonic and fatty aromatic sulfonic acids, partially or completely hydrogenated or alkylated dicarbocyclic sulfonic acids, etc., all of which are available or may be readily prepared by known methods. The hydroxylated esters of the sulfonic acids are known. Direct reaction between a sulfonic acid and a polyhydric alcohol, such as ethylene glycol, to produce them, is impractical, because the yield is very small, if any yield is obtained. The esters may, however, be prepared by converting the sulfonic acid into the sulfonchloride, and reacting the sulfonchloride with a polyhydric alcohol, with liberation of hydrochloric acid and formation of the hydroxylated ester. Usually, however, a salt of the sulfonic acid, for example, the sodium salt, will be reacted with a chlorhydrin, such as ethylene glycol chlorhydrin or the like. Another method of preparing suitable hydroxylated esters of sulfonic acids is to treat the free sulfonic acid, in an anhydrous state, with an alkylene oxide, or a compound containing an olefin oxide radical, such as glycerin epichlorhydrin, glycide alcohol, ethylene oxide, propylene oxide, one of the butylene oxides, cyclopentane oxide, stryene oxide, etc., with introduction of a hydroxy alkyl or hydroxyoxyalkylene group. If, for example, an anhydrous sulfonic acid be treated with one mole of ethylene oxide, the sulfonic acid ester of ethylene glycol is produced. If two moles of ethylene oxide are used, the ester of the type:

RSO₃C₂H₄OC₂H₄OH is produced; and if more ethylene oxide is used, esters with recurring ether linkages are produced.

15. *Hydroxylated pyridinium derivatives.*—Pyridine hydrochloride will react with certain hydroxy amines and amides as illustrated by the equation:

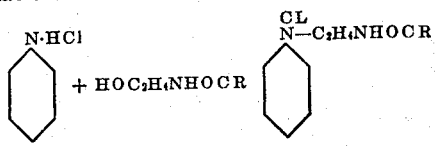

If the hydroxy amine or amide has more than one hydroxy group, as in the mono ricinoleic acid amide of diethanolamine, the resulting pyridinium derivative will have at least one hydroxyl group which may be esterified. Such derivatives of pyridine, and other hydroxylated derivatives of pyridine, of which there are a large number available, may be used in producing the new compositions of the invention, including such products as are derived by reacting pyridine hydrochloride with hydroxyethyl ricinoleyl amide, the corresponding hydroxyethyl amide derived from oxidized castor oil, phenylstearic hydroxyethyl amide, the product derived by treating castor oil with chloracetyl chloride, bis(hydroxyethyl) ricinoleyl amide, etc.

Of particular importance in this group are the pyridinium derivatives derived from partially esterified alkylol amines, having an aryl group directly linked to nitrogen, such as the mono fatty acid esters of phenyl diethanolamine, and the like, where the fatty acids are the detergent-forming fatty acids, and particularly ricinoleic acid, although, of course, the esters of such polyhydroxy alkylolamines with other carboxy acids, including other detergent-forming carboxy acids, as well as non-detergent-forming acids, e. g., acetic acid, to which reference has heretofore been made, may be used.

16. *Oxyalkylated imidazolines.*—This group includes the oxyalkylated imidazolines substituted in the 2-position by a radical such as an alicyclic hydrocarbon radical, an alkyl radical, hydroxylated alkyl or alicyclic radical, or the like. The compounds included in this group may be regarded as derivatives of imidazole, or glyoxaline, represented by the formula:

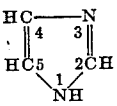

The imidazolines may be regarded as the dihydro-derivative of imidazoles, and may be indicated by the formula:

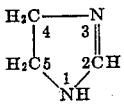

The production of 2-substituted derivatives of compounds of this type is well known. They may be produced by reacting polyamines and higher carboxylic acids under appropriate conditions, with formation of derivatives which may be represented by the formula:

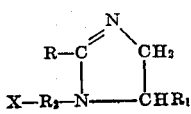

in which R represents the residue of the carboxy acid, and may be an alkyl or alkenyl or other group, R₁ represents hydrogen or an alkyl group, R₂ represents an alkylene group, or a lower alkyl substituted alkylene group and X represents a hydroxyl group, an amino group, or an aminoalkylene substituted amino group. The preparation of such compounds is well known. If such compounds are treated with an alkylene oxide, such as ethylene oxide, the oxyalkylene radical is readily introduced, and it is such oxyalkylated compounds which are included within this class.

17. *Hydroxy acids.*—There are a number of hydroxy carboxylic acids which are capable of reacting with carboxy acids by a reaction involving esterification of the hydroxyl group, and it is these acids which constitute this subclass. Included in it are the hydroxy acids of the detergent class such as ricinoleic acid, hydroxy and dihydroxystearic acid, diricinoleic acid, aleuritic acid, alpha-hydroxylauric acid, hydroxylated acids derived from such materials as naphthenic acids, hydroxy acids produced in the oxidation of petroleum hydrocarbon, hydroxy acids produced by such procedures as chlorination of a fatty acid, either by addition or substitution and subsequent hydrolysis, hydroxylated aryl fatty acids such as a hydroxylated aryl stearic acid produced from ricinoleic acid, and the like. Also included are the lower hydroxy acids such as lactic acid, hydroxybutyric acid, alpha-hydroxy capric, caprylic and caproic acids.

Where the hydroxy acids are used they contain both reactive hydroxyl group and a reactive carboxyl group, capable of reacting with carboxyl groups and hydroxyl groups respectively. For that reason, if such an acid is reacted with a fractional ester of an oxyalkylated polyhydroxy body which contains free hydroxyl groups, the reaction product will usually consist of a mixture of products resulting from esterification reactions involving the hydroxyl group of some of the hydroxy carboxy acid and esterification reactions involving the carboxy group of the hydroxy carboxy acid. Of course, if the fractional ester does not contain any free hydroxyl group, reaction at the carboxy group of the hydroxy acid cannot occur.

18. *Hydroxylated acylated diamides.*—Included in this group of alcohols are the compounds having an acyl radical derived from a polybasic carboxy acid having not more than 6 carbon atoms, including those referred to above under the heading "Polybasic carboxy compounds," linked to two amido nitrogen atoms, an acyl radical derived from a monocarboxy acid, advantageously a detergent-forming monocarboxy acid having 8 to 32 carbon atoms, and an alcoholiform hydroxyl radical.

The polybasic carboxy acids which may be used are described above, as are the detergent-forming acids which may be used. The fatty acids, and particularly the unsaturated fatty acids such as ricinoleic acid, oleic acid, and the mixed acids derived from such materials as soya bean, rape seed, sesame, cottonseed, corn, peanut and similar oils are advantageously used.

A wide range of primary and secondary amines, and in particular diethanolamine, monoethanolamine, ethylethanolamine, methylmethanolamine, propanolamine, and propylpropanolamine may be used as may cyclohexanolamine, dicyclohexanolamine, cyclohexylethanolamine, cyclohexylpropanolamine, benzylethanolamine, benzylpropanolamine, pentanolamine, octadecylethanolamine, and the like. If one of the carboxy acids used, i. e., either the polycarboxy acid or the detergent-forming acid, is hydroxylated as in the case of tartaric acid, stearic acid, hydroxysuccinic acid, ricinoleic acid, hydroxystearic acid, and the like, it is not necessary that the primary or secondary amine used be hydroxylated. With such acids, one may use such amines as ethylamine, amylamine, cyclohexylamine, dibutylamine, and the like.

Of course, if the amine is a hydroxylated amine, the group to which the hydroxy group is linked may be an oxyalkylene group, rather than a hydrocarbon group, such for instance as di(hydroxyethyloxyethyl) amine.

The production of these hydroxylated acylated diamides may be illustrated by the production of amide from oxalic acid, monoethanolamine and ricinoleic acid. Thus one mole of diethyl oxalate and two moles of monoethanolamine may be reacted by refluxing for a substantial period of time, for example 20 hours, with the production of bis(hydroxyethyl) oxalic acid diamide, which may then be reacted with two moles of ricinoleic acid producing the corresponding diester or with one mole of ricinoleic acid, producing the corresponding monoester of the formula:

Other amides of the type under discussion may be readily prepared by similar procedures. The general process is known; the specific process as applied to the production of compounds from polybasic carboxy acids is described in detail in our prior application, Serial 447,166, filed June 15, 1942, issued as Patent No. 2,353,709, July 18, 1944.

19. *Hydroxylated acylated amides.*—The compounds included within this group are those in which there is an acyl radical derived from a short chain monocarboxy acid, that is, one having not more than 5 carbon atoms, linked to a nitrogen atom, an acyl radical derived from a detergent-forming monocarboxy acid having 8 to 32 carbon atoms and an alcoholiform hydroxyl radical.

The detergent-forming carboxy acids having an alcoholiform hydroxyl radical have already been sufficiently described, as have the lower monocarboxy acids.

If the lower carboxy acid is not hydroxylated, the primary or secondary amine which is used must be, and such hydroxylated amines as have been mentioned under the heading "Hydroxylated amines" above may be used. If the lower carboxy acid is a hydroxy acid, such as glycolic acid, lactic acid, hydroxybutyric acid, or the like, the amine need not be hydroxylated, but one may use such amines as amylamine, diamylamine, butylamine, dibutylamine, ethylamine, diethylamine, benzylamine, cyclohexylamine, and the like, as the hydroxy group of the lower carboxy acid may be esterified by a hydroxylated detergent-forming acid such as ricinoleic acid or hydroxy stearic acid. In any event, the final amide must have at least one free hydroxyl group which may be on the lower monocarboxy acid, on the detergent-forming acid or may be linked to the nitrogen through an alkylene group.

These amides are readily prepared, for example, by reacting a selected alkylolamine with an ester of a lower monocarboxy acid to form the amide and then esterifying with the detergent-forming acid.

20. *Hydroxylated acylated polyamines.*—This group includes the hydroxylated acylated polyamino compounds which are free from ether linkages, of the type described in U. S. Patent 2,243,329. Representative compounds of this type may have the formula:

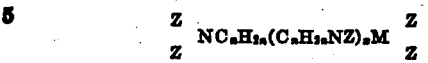

in which $n$ and $x$ are small whole numbers ranging up to 10 ($x$ may be 0) and Z is hydrogen, an acyl radical or an alkyl, hydroxyalkyl, aminoalkyl, acyloxyalkylene or other group. The compounds must have at least one hydroxyl group, which may be a hydroxyl group linked to an acyl group, as in the case of acyl groups derived from such acids as lactic acid or ricinoleic acid, or may be linked to an alkylene group, or an oxyalkylene group or the like.

21. *Hydroxylated acrylated monoamines.*—This group of compounds includes the hydroxylated acylated monoamines free from ether linkages, which are illustrated by compounds of the formula type:

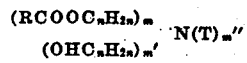

in which R represents the carbon linked chain of a carboxy acid, usually a detergent-forming acid, T represents a hydrogen atom or a hydrocarbon radical or an oxyalkylene radical or an acylated hydroxyalkyl radical or the like; $n$ represents a small whole number less than 10; $m$ represents 1, 2 or 3, $m'$ represents 0, 1 or 2 and $m''$ represents 0, 1 or 2, with the proviso that $m+m'+m''$ equals 3. At least one alcoholiform hydroxyl group must be present; it may be linked to the radical R or the radical T, in those cases in which $m'$ is 0. Such hydroxylated bodies are readily prepared by esterifying an alkylolamine, such as triethanolamine, with a carboxy acid or its functional equivalent such as an ester or acyl chloride, due precaution being taken to avoid the formation of an amide, in the case of primary or secondary amines. If the carboxy acid is a hydroxylated acid such as lactic or glycollic acid or advantageously ricinoleic or hydroxy stearic acid, the amine used need have but one hydroxy group, as in diethylethanolamine. On the other hand, if the carboxy acid is not hydroxylated, then one of the other radicals linked to the nitrogen must be hydroxylated as where the amines are produced from ethyldiethanolamine.

22. *Miscellaneous alcohols.*—Heterocyclic alcohols such as furfuryl and tetrahydrofurfuryl alcohols and the terpene alcohols such as borneol, fenchyl alcohols, menthyl alcohols and the like, are included in this sub-class.

The foregoing classification of hydroxy compounds, and particularly compounds having alcoholiform hydroxyl groups is not intended to be exhaustive. Obviously, there are other types of hydroxy compounds which might be used, and it is intended to include these within the scope of the invention, the foregoing classification serving to indicate those types of compounds which seem to be the most important at the present time.

The new compositions of the invention are usually water-soluble, or water-dispersible, although a relatively small proportion of them, for a number of reasons, may be rather insoluble. The particular solubility characteristics of the compositions in water, at least, will thus vary quite widely, and will depend largely upon the selection of the radicals of which the materials are composed. The central radical will usually be a solubilizing radical having a relatively large number of ether linkages. The solubility characteristics of the sulfo-polycarboxy acids combined in the compositions may also vary considerably, although, because of the sulfo-group or groups which they have, the acids will tend to impart water-solubility to the final product, except in certain special cases which will be described later.

With the hydroxylated bodies with which the fractional ester is esterified, the entire range from complete water-solubility to substantially complete water-insolubility is included, for example, in the contrast between ethyl alcohol and octadecyl alcohol. Where a material like ethyl alcohol is used, its introduction has no marked effect on the water-solubility of the compound as a whole. On the other hand, introduction of the octadecyl alcohol radical results in a material having substantially decreased water-solubility, but usually increased surface activity. The octadecyl ester of the product resulting from the treatment of the dihydrogen dimaleate of oxyethylated glycerin having 9 to 30 ethylene groups has two large hydrocarbon radicals and a high surface activity. Treatment of this material with sodium bisulfite, with conversion of the maleic acid residues to sulfo-succinic acid residues, increases the water solubility and the surface activity.

Where the hydroxylated bodies used are the more complex amino or amido derivatives, they may of themselves be water-soluble or water-dispersible or water-insoluble, and may of themselves be effective surface active agents.

However, if the hydroxylated body used is an amino alcohol, the sulfo-compound finally produced may be less soluble than the corresponding unsulfonated ester, because of the formation of inner salts through interaction of the sulfo-group or groups and the amino group or groups. In certain cases such relatively insoluble sulfo-derivatives may be desirable, but ordinarily the advantage of the sulfo-derivative over corresponding or closely related unsulfonated products is largely due to the increase in water-solubility or dispersibility, and for that reason the compositions in which such inner salt formation takes place will not ordinarily be prepared.

In all of the foregoing, the description has been of monomeric compositions. Whether the final compositions are prepared by the use of an unsaturated acid such as maleic acid, and converting this to the ester and treating with sodium bisulfite or the like to form the sulfo-derivative, or whether the compositions are prepared using the sulfo-polycarboxy acid and esterifying it by an appropriate procedure, there may be a tendency to form polymeric compositions, and this formation of polymeric bodies may be due to continuous esterification or may be due to etherification, in both instances elimination of water being involved.

Also, the compositions, particularly where they are produced by preparing esters of an unsaturated acid such as maleic acid and treating it with sodium bisulfite or the like, tend not only to contain or consist of polymeric compositions but to contain heat-rearranged derivatives, by-products or cogeneric materials of very real complexity which defy analysis or representation by formula. This will be readily understood when it is considered that the new compositions may contain free hydroxyl, carboxyl or other reactive groups such as amino groups, that they contain a number of esters and ether linkages, and may contain amide or amino nitrogen or other linkages of that type with the definite possibility of internal rearrangement of the composition on heating. Thus the heating of a product, which may initially be a monomeric product, may result in the production of the polymeric form, but more probably will result in the production of some of the polymeric form and a substantial amount of heat-rearranged monomers and polymers of unidentified composition. The entire resulting product may be sub-resinous in nature or the polymerization or other reactions may not have proceeded that far, so that the product may correspond to a dimer or trimer and yet contain a substantial amount of heat-rearranged material.

The invention will be illustrated by the following specific examples, but is not limited thereto. In presenting the examples, an attempt has been made to select examples which illustrate the range of compositions included within the invention, without multiplying the number of examples unduly. The specific examples illustrate the preparation of a typical oxyalkylated polyhydroxy body, the preparation of two typical fractional esters therefrom, using an unsaturated acid, one of these esters having free hydroxyl groups and the other not having free hydroxyl groups, and the preparation of certain typical compositions included within the scope of the invention.

*Example I.*—(Illustration of preparation of oxyalkylated polyhydroxy body.) 184 lbs. of glycerin is mixed with ½% by weight of caustic soda solution, S. G. 1.383, as a catalyst. Ethylene oxide is added in lots of about 44 lbs. while maintaining the temperature at 150–180° C. The gauge pressure when the ethylene oxide is added will be around 200 lbs., and when it has completely reacted, will drop to zero. Another lot of ethylene oxide is then added, and the procedure repeated until about 632.5 lbs. of ethylene oxide have been reacted, i. e., about 15 moles of ethylene oxide to each mole of glycerin, giving a product in which, statistically taken, there are 5 ethylene oxide radicals for each hydroxyl group of the glycerin.

*Example II.*—(Illustration of the preparation of a fractional ester having free hydroxyl groups using an unsaturated acid.) One mole of the oxyethylated glycerol prepared as described in Example I is reacted with one mole of maleic anhydride by heating to about 110° C. for 30 minutes to 2 hours, with constant stirring, yielding a monomaleate.

*Example III.*—(Illustration of preparation of a fractional ester with no free hydroxyl group using an unsaturated acid.) The procedure is the same as that of Example II except that 3 moles of maleic anhydride are used for each mole of oxyethylated glycerol, so that the trimaleate is produced.

The fractional esters of either Example II or Example III are then reacted with the hydroxylated body of the type previously described. With a product such as that of Example II, equimolar proportions of hydroxylated body and the fractional ester are used, with heating until the carboxy acidity disappears. Continued heating may result in the production of heat-rearranged products or cogeneric materials or polymeric forms of the product, but products made by esterifying the fractional ester of Example II show, in general, little tendency to form resins or to polymerize unless the hydroxylated body includes reactive groups, such as carboxy groups, which, taken with the free hydroxyl groups remaining in the oxyethylated glycerin, tend to impart resinifying properties to the ester. The fractional ester of Example III may be reacted with the selected hydroxylated body in molar proportions ranging from 1:1 to 1:3. Where insufficient hydroxylated material is used, on a molar basis, to esterify the three free carboxy groups of the trimaleate, a product having free carboxy groups is obtained, and if the hydroxylated body used is a polyhydroxy body, compositions which polymerize readily may be obtained.

Suitable alcohols for preparing these esterified products are the ordinary aliphatic alcohols such as cetyl alcohol, lauryl alcohol, oleyl alcohol, stearyl alcohol, octyl alcohol, ethanol, isopropyl alcohol, butyl alcohol, alcohols derived by the hydrogenation of esters of naturally occurring fatty acids, naphthenic acids, resin acids, abietic acids, acids derived from the oxidation of petroleum hydrocarbons (oxidized wax) cholesterol, octadecanediol, octamethyl glycol, cyclohexyl alcohol, hydroxydiphenyl, and other alcohols, pure or mixed, may be used. Or, as pointed out, any of the other hydroxylated bodies to which reference has been made, may be used, with the production of esters having the polyhydroxy compounds such as glycerin linked to oxyethylene chains, at least one of which is esterified by a maleic acid radical, the other carboxy group of which is in turn esterified by a hydroxylated body or bodies.

To produce final compositions of the invention, esters of the unsaturated aliphatic acid are treated with sodium bisulfite or sulfite or other suitable bisulfite or sulfite, usually in slight excess, to convert the maleic acid residue or residues to the sulfo-succinic acid residue or residues.

*Example IV.*—One of the esters of Examples II or III, for example, the dioctyl ester of the trimaleate of oxyethylated glycerin of Example III is treated with a slight excess of sodium bisulfite solution at about 100° C., advantageously under superatmospheric pressure, with agitation and for a sufficient period of time for the sulfonation to proceed to a substantial extent. The resulting product, while a mixture of various materials, contains a large proportion of the dioctyl ester of the oxyethylated glycerin fractional triester with sulfosuccinic acid, a material with marked surface activity.

*Example V.*—The oxyethylated glycerin of Example I is treated with the mono-alkali metal salt of sulfo-succinic acid in the molar proportions of 1:2 by heating to a temperature of about 150° C., and with the use of a small amount of a catalyst such as toluene sulfonic acid. Water is advantageously removed during the reaction by distilling it off with xylenol or other inert material, in the usual way. The resulting ester, without purification, is reacted with an excess of a suitable hydroxylated body to esterify it to carboxyl groups. The catalyst used in the initial esterification is effective in speeding up this reaction, and the water formed may be removed in the same way. Instead of using sulfo-succinic acid, other sulfopolycarboxy acids, such as disulfo-succinic, sulfo-maleic, sulfo-chlorsuccinic, sulfoadipic, sulfo-pyrotartaric, sulfo-glutaric, sulfosuberic, sulfo-sebasic, sulfo-fumaric, sulfo-dimethyl-succinic, sulfo-methyl glutaric, other sulfo-alkyl succinic or alkyl sulfo-glutaric, sulfopimelic and others may be used.

As previously pointed out, the procedure illustrated by this example is not as readily carried out, nor does it give as good yields ordinarily as the procedure of Example IV. The procedure of this example, however, has the advantage that it may be carried out with the use of any of the available sulfo-polycarboxy acids, whereas the procedure of Example IV is limited to the production of derivatives of sulfo-polycarboxy acids which are producible by the treatment of an ester of an unsaturated polycarboxy acid, such as maleic acid, with sodium bisulfite, or other bisulfites or sulfites. The final compositions may, of course, be produced in other ways than those of the examples, but ordinarily, unless some special circumstances dictate the choice of another process, or unless it is desirable to produce some special product, the process illustrated in Example IV is to be used. The differences in the final product resulting from the choice of different polycarboxy acids is not, ordinarily, of great importance. Thus, ordinarily, the final product will range from such compounds as the ethanol ester of oxyethylated glycerol monohydrogen monosulfo-succinate through compounds in which the glycerin is replaced by a polyhydroxy body having 6 or more hydroxy groups, such as the sugar alcohols and other more complex polyhydroxy bodies, in which all of the free hydroxyl groups of the oxyalkylated product are esterified by the sulfo polybasic sulfo polycarboxy acid and in which one or more or even all of the carboxy groups not attached to the oxyethylated body are esterified by complex hydroxylated bodies which may be many times as large as the ethanol radical. In such compounds, the slight difference between the residues of the various sulfo-polycarboxy acids, such as those given above, are not of any particular importance except in special circumstances as where the sulfo-polycarboxy acid contains, for example, more than one sulfo group, as in disulfosuccinic acid, in which the presence of the two sulfo groups may exert a very considerable influence upon the properties of the final product, or instances in which the sulfo-polycarboxy acid residue contains another radical which has a substantial influence upon the properties of the final composition, for example, a long chain alkyl radical as in certain alkyl sulfo-succinic acid residues.

We claim:

1. Compositions of matter containing a substantial proportion of esterified acidic sulfo-polycarboxy acid fractional ester of an oxyalkylated alcoholiform polyhydroxy body, said alcoholiform polyhydroxy body having at least 3 alcoholiform hydroxyl groups and not more than 10 carbon atoms, the esterification involving carbon-linked hydroxyl groups of organic hydroxylated bodies.

2. Compositions of matter containing a substantial proportion of esterified acidic sulfo-succinic acid fractional ester of an oxyalkylated alcoholiform polyhydroxy body, said alcoholiform polyhydroxy body having at least 3 alcoholiform hydroxyl groups and not more than 10 carbon atoms, the esterification involving carbon-linked hydroxyl groups of organic hydroxylated bodies.

3. Compositions of matter containing a substantial proportion of esterified acidic sulfo-polycarboxy acid fractional ester of an oxyalkylated alcoholiform polyhydroxy body, said alcoholiform polyhydroxy body having at least 3 alcoholiform hydroxyl groups and not more than 10 carbon atoms, the esterification involving carbon-linked hydroxyl groups of high molal organic hydroxylated bodies having at least 8 carbon atoms joined together without interruption by a hetero atom.

4. Compositions of matter containing a substantial proportion of esterified acidic sulfo-succinic acid fractional ester of an oxyalkylated alcoholiform polyhydroxy body, said alcoholiform polyhydroxy body having at least 3 alcoholiform hydroxyl groups and not more than 10 carbon atoms, the esterification involving carbon-linked hydroxyl groups of high molal organic hydroxylated bodies having at least 8 carbon atoms joined together without interruption by a hetero atom.

5. Compositions of matter containing a substantial proportion of esterified acidic sulfo-polycarboxy acid fractional ester of an oxyethylated alcoholiform polyhydroxy body, said alcoholiform polyhydroxy body having at least 3 alcoholiform hydroxyl groups and not more than 10 carbon atoms, the esterification involving carbon-linked hydroxyl groups of organic hydroxylated bodies.

6. Compositions of matter containing a substantial proportion of esterified acidic sulfo-succinic acid fractional ester of an oxyethylated alcoholiform polyhydroxy body, said alcoholiform polyhydroxy body having at least 3 alcoholiform hydroxyl groups and not more than 10 carbon atoms, the esterification involving carbon-linked hydroxyl groups of organic hydroxylated bodies.

7. Compositions of matter containing a substantial proportion of esterified acidic sulfo-polycarboxy acid fractional ester of an oxyethylated alcoholiform polyhydroxy body, said alcoholiform polyhydroxy body having at least 3 alcoholiform hydroxyl groups and not more than 10 carbon atoms, the esterification involving carbon-linked hydroxyl groups of high molal organic hydroxylated bodies having at least 8 carbon atoms joined together without interruption by a hetero atom.

8. Compositions of matter containing a substantial proportion of esterified acidic sulfo-succinic acid fractional ester of an oxyethylated alcoholiform polyhydroxy body, said alcoholiform polyhydroxy body having at least 3 alcoholiform hydroxyl groups and not more than 10 carbon atoms, the esterification involving carbon-linked hydroxyl groups of high molal organic hydroxylated bodies having at least 8 carbon atoms joined together without interruption by a hetero atom.

9. Compositions of matter containing a substantial proportion of an esterified acidic sulfo-succinic acid fractional ester of an oxyethylated glycerin, having a total of 9 to 30 ethylene groups in the oxyethylene chains linked to the glycerin, the esterification involving carbon-linked hydroxyl groups of high molal organic hydroxylated bodies having at least 8 carbon atoms joined together without interruption by a hetero atom.

MELVIN DE GROOTE.
BERNHARD KEISER.